United States Patent [19]

Hitomi

[11] Patent Number: 5,259,565
[45] Date of Patent: Nov. 9, 1993

[54] DRAG STRUCTURE OF A FISHING REEL
[75] Inventor: Yasuhiro Hitomi, Sakai, Japan
[73] Assignee: Shimano, Inc., Osaka, Japan
[21] Appl. No.: 786,068
[22] Filed: Oct. 31, 1991
[30] Foreign Application Priority Data Nov. 7, 1990 [JP] Japan .................. 2-116794[U]

[51] Int. Cl.⁵ .......................................... A01K 89/027
[52] U.S. Cl. ................................. 242/245; 242/246; 188/72.8; 188/83
[58] Field of Search ............... 242/244, 245, 246; 188/83, 72.1, 72.8

[56] References Cited

U.S. PATENT DOCUMENTS

| | | | |
|---|---|---|---|
| 2,384,561 | 9/1945 | Muffett | 188/83 X |
| 4,555,072 | 11/1985 | Hitomi | 242/245 |
| 4,696,437 | 9/1987 | Yoshikawa | 242/244 |
| 4,725,012 | 2/1988 | Councilman | 242/245 |
| 4,749,285 | 6/1988 | Noda | 242/244 |
| 4,776,526 | 10/1988 | Saito | 242/245 |

FOREIGN PATENT DOCUMENTS 2245470  1/1992  United Kingdom ............... 242/245

Primary Examiner—Joseph J. Hail, III
Attorney, Agent, or Firm—Dickstein, Shapiro & Morin

[57] ABSTRACT

A fishing reel includes a drag controller containing, in an inside space thereof, a fixed element mounted on a stationary spool shaft, and an intermediate movable element rotatable and slidable relative to the fixed element. The intermediate movable element includes a first screw portion meshed with the spool shaft, and a second screw portion meshed with the drag controller. The two screw portions have different pitches. A slidable pin connects the intermediate movable element to the fixed element or to the drag controller to select between the two screw portions for a different drag increase rate.

10 Claims, 3 Drawing Sheets

DRAG STRUCTURE OF A FISHING REEL

BACKGROUND OF THE INVENTION

1. Field of the Invention

This invention relates to a drag structure of a fishing reel.

2. Description of the Related Art

In a conventional drag structure of a fishing reel, an increase in drag relative to a unit amount of operation of a drag controller is dependent on a fixed characteristic.

Thus, there have been difficulties in use since drag is adjustable only on a predetermined characteristic. Where the drag has a low increase rate relative to a unit amount of operation, a drag device is suitable only to limited types of fish or limited reeling characteristics. Where the drag has a high increase rate relative to a unit amount of operation, the drag device is suitable to a wide variety of fish but limited to a narrow range of drag setting for each control position of the drag controller, and hence lacking in niceties of adjustment.

SUMMARY OF THE INVENTION

The object of the present invention is to provide a drag structure including a simple modification made to a control structure of a drag device to realize a high degree of adaptability.

The above object is fulfilled, according to the present invention, by a drag structure comprising a drag controller for acting on a drag device to produce drag, first and second screws for causing the drag controller to move by different pitches relative to the drag device, and a switchable connecting device for selecting one of the first and second screws to move the drag controller.

This construction has the following functions and effects.

When the drag controller is caused to move through the screw having the smaller pitch, the drag controller contacts the drag device to produce drag at a low increase rate. When the drag controller is caused to move through the screw having the greater pitch, a high drag increase rate is obtained.

Thus, the screw having the smaller pitch is used when fine adjustment is to be made to the drag within a narrow range. The screw having the greater pitch is used when a wide range of drag is desired. In this way, the single reel is adapted switchable for use.

It is conceivable that a similar effect is produced by a structure including a cam plate defining a cam surface extending perpendicular to an axis of rotation of the drag controller. In this structure, when the drag controller is rotated about its axis, the drag controller contacts a different position on the cam surface. As a result, the drag controller moves toward or away from the drag device, thereby to vary the drag. It is possible to vary inclination of the cam surface to vary the drag increase rate. In this case, however, the inclination of the cam must not be too steep since drag must be set by one rotation at most of the drag controller. This structure also has the disadvantage of allowing a limited range of drag setting. In the present invention, the drag controller may make plural rotations without any problem since the screws are used. The present invention has the further advantage that a suitable pitch and stroke may be selected as desired.

Other features and advantages of the present invention will be apparent from the following description.

BRIEF DESCRIPTION OF THE DRAWINGS

The drawings show a drag structure of a fishing reel according to the present invention, in which.

DETAILED DESCRIPTION OF THE PREFERRED EMBODIMENTS

A drag structure of a fishing reel according to the present invention will be described in detail with reference to the drawings.

Figure 1:
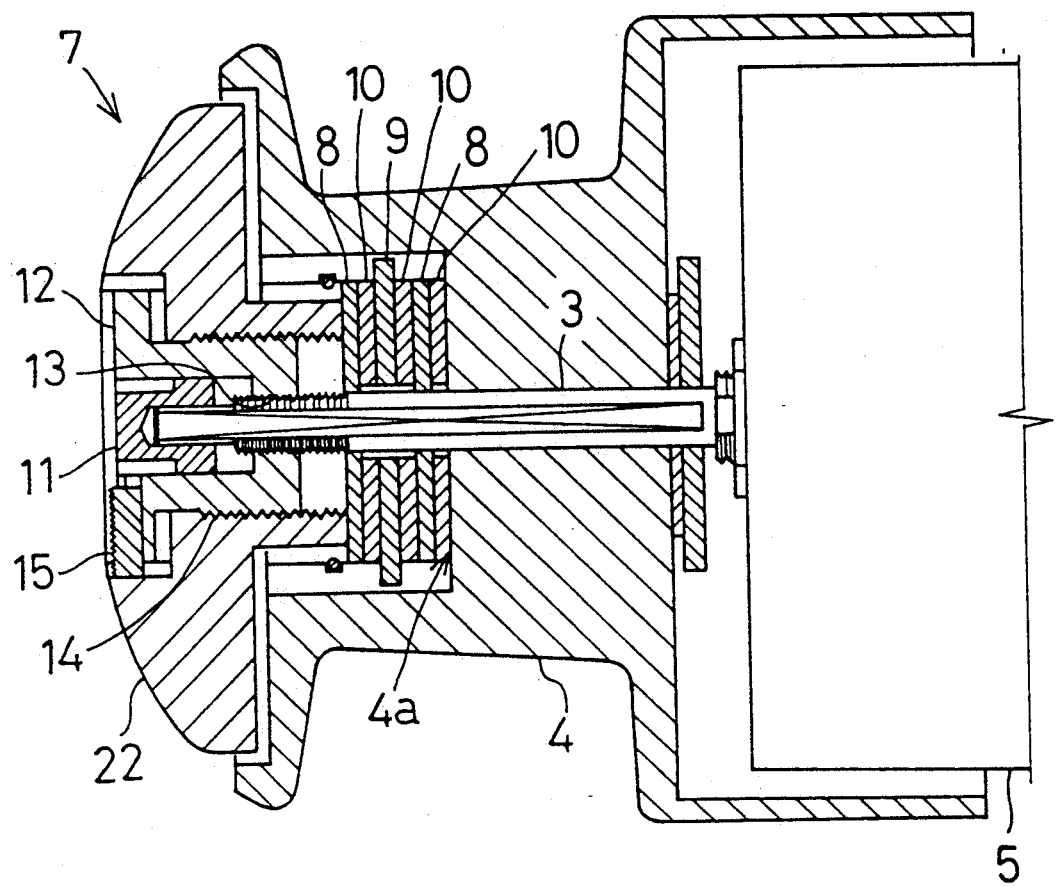
FIG. 1 is a side view in vertical section of the drag structure.
Figure 2:
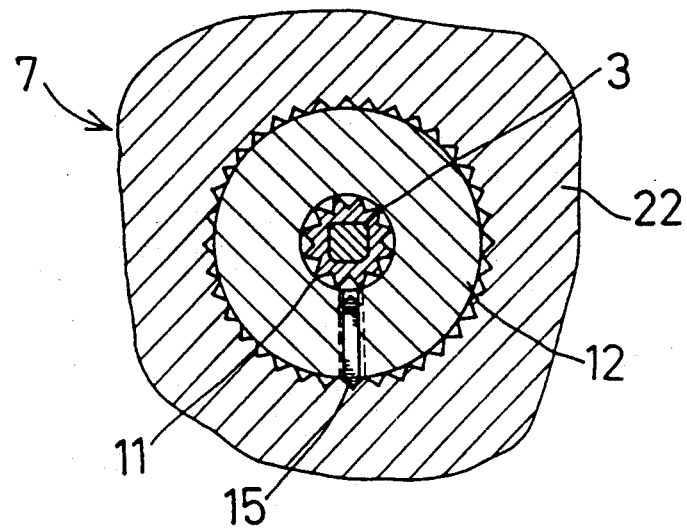
FIG. 2 is a front view in vertical section of a switchable connecting device.
Figure 3:
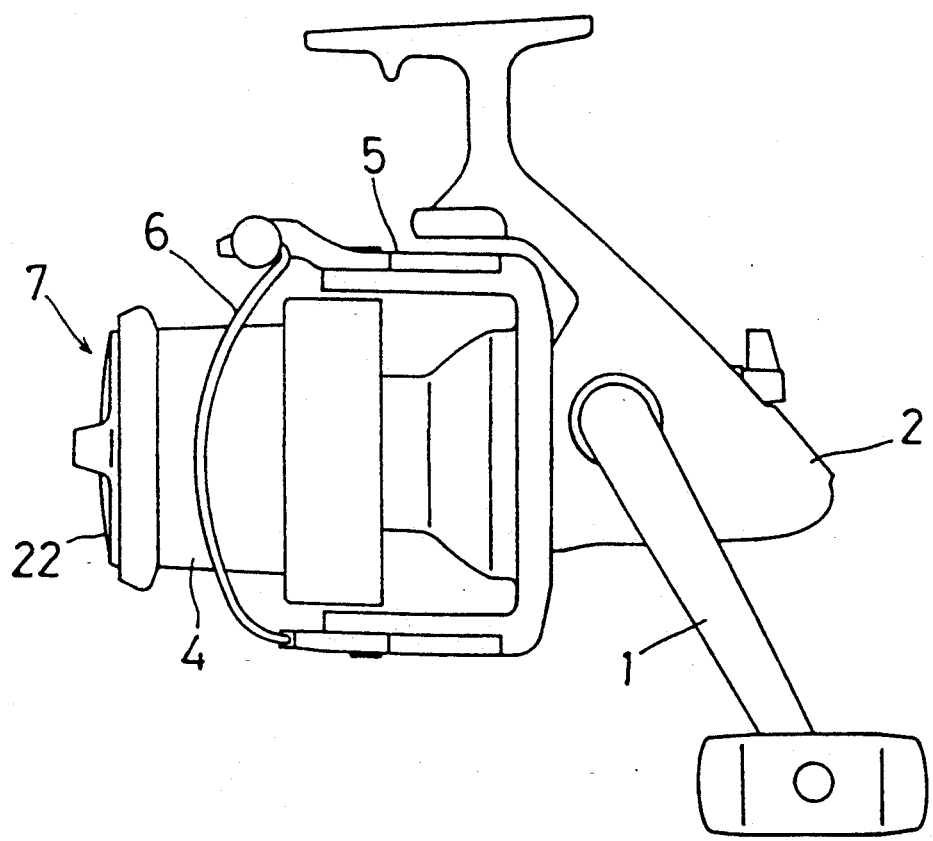
FIG. 3 is a side view of the fishing reel.

FIGS. 1 through 3 show a spinning reel embodying the present invention. This reel has a fishing line winding handle 1 connected to a winding transmission system mounted in a reel body 2. The reel body 2 includes an unrotatable spool shaft 3 mounted in a forward portion thereof. The spool shaft 3 carries a spool 4 mounted for rotation relative thereto. A rotary frame 5 carrying a bail arm 6 is mounted for rotation around the spool 4.

The spool 4 defines a recess in a forward end thereof for accommodating a drag device 7 that acts on the spool 4. A drag controller 22 is disposed outwardly of the drag device 7 for acting on the drag device 7 to produce drag.

The drag structure will be described in detail next.

As shown in FIG. 1, the drag device 7 includes two pressure plates 8 slidable axially of the spool shaft 3 and not rotatable relative thereto. A pressure receiving plate 9 is mounted between the two pressure plates 8 to be rotatable with the spool 4. The drag device 7 further includes three friction plates 10, one between one of the pressure plates 8 and the pressure receiving plate 9, the second one between the pressure receiving plate 9 and the other pressure plate 8, and the third one between the other pressure plate 8 and an abutting wall surface 4a of the spool 4. The drag controller 22 has a stepped section including an inward end face for contacting the drag device 7. The drag controller 22 defines an internal space for accommodating a fixed element 11 mounted on the spool shaft 3, and an intermediate movable element 12 rotatable and slidable relative to the fixed element 11. The intermediate movable element 12 includes a first screw portion 13 centrally thereof which is meshed with the spool shaft 3. Further, the intermediate movable element 12 includes a second screw portion 14 defined on an intermediate position thereof and meshed with the drag controller 22. (The second screw portion 14 has a greater pitch than the first screw portion 13 in this example, but this may be reversed.) An engaging pin 15 is fitted in the intermediate movable element 12 to be slidable in a direction perpendicular to the spool shaft 3 for selectively engaging the drag controller 22 and fixed element 11. When the slidable engaging pin 15 engages the drag controller 22 and intermediate movable element 12 as shown in FIG. 1, the drag controller 22 and intermediate movable element 12 are rotatable together around the spool shaft 3 to move axially of the spool shaft 3 by the pitch of the first screw portion 13. When the engaging pin 15 is slid from the position shown in FIG. 1 to a position to engage the intermediate movable element 12 and fixed element 11, the intermediate movable element 12 is fixed to the spool shaft 3 through the fixed element 11. In this state, the drag controller 22 is movable relative to the intermediate movable element 12 by the pitch of the second screw portion 14.

Thus, the pitch of the second screw portion 14 provides a greater amount of movement per unit amount of operation of the drag controller 22, i.e. a higher drag increase rate, than the pitch of the first screw portion 13.

In the above embodiment, the present invention is applied to the front drag structure. A rear drag structure will be described next with reference to FIG. 4.

Figure 4:
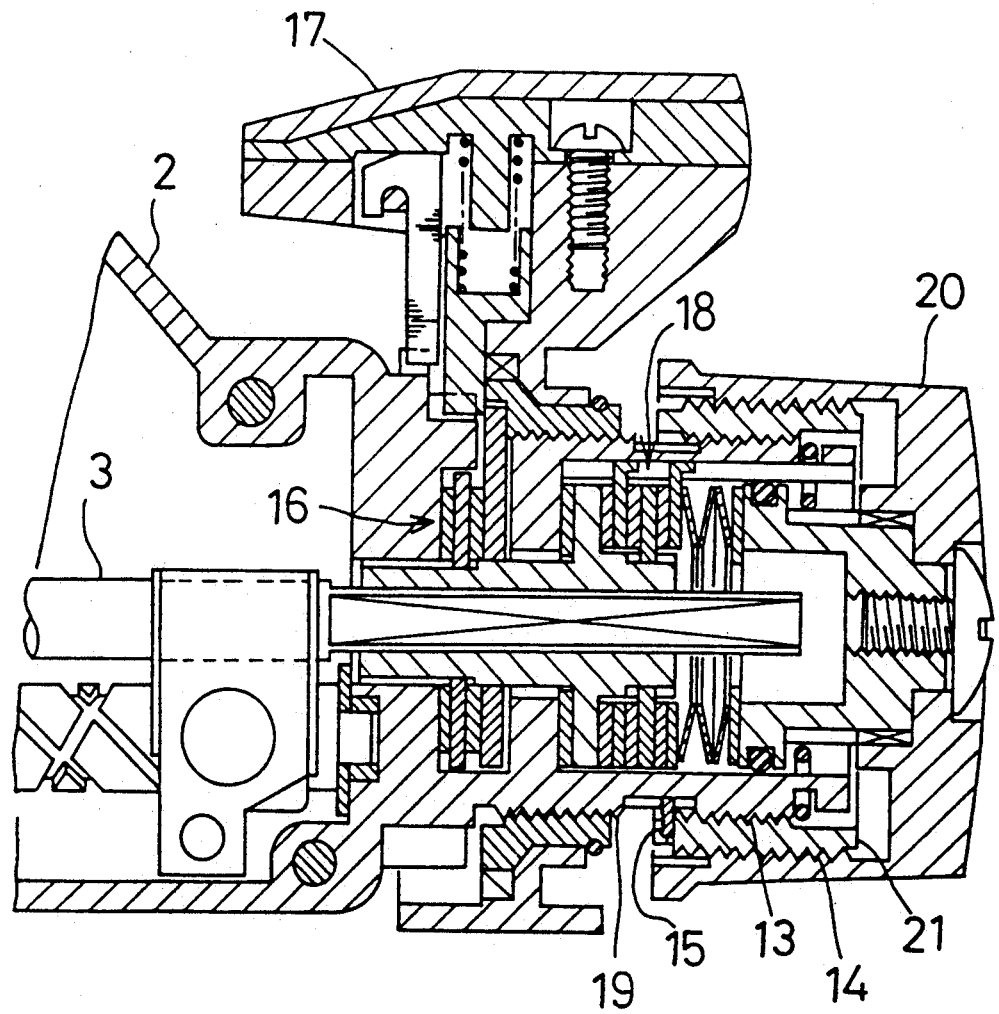
FIG. 4 is a side view in vertical section of a rear drag device embodying the present invention.

In FIG. 4, numeral 16 denotes a first drag device for connecting a spool shaft 3 rotatable with a spool 4 to a reel body 2. Numeral 17 denotes a set lever pivotable around the spool shaft 3 to adjust drag of the first drag device 16. Numeral 18 denotes a second drag device for applying a pressing force to the first drag device 16 through a push sleeve 19. A drag controller 20 is provided for adjusting the drag. The push sleeve 19 includes a first screw portion 13 defined on an outer peripheral surface thereof, and an intermediate sleeve 21 is meshed therewith to be screw-fed. The intermediate sleeve 21 includes a second screw portion 14 defined on an outer peripheral surface thereof, and the drag controller 20 is meshed therewith to be screw-fed. A slidable engaging pin 15 is mounted for engaging the drag controller 20, intermediate sleeve 21 and push sleeve 19. The engaging pin 15 is switchable between a position to connect the drag controller 20 and intermediate sleeve 21 for screw-feeding in unison, and a position to allow screw-feeding of the drag controller 20 alone. Consequently, the drag controller 20 may be screw-fed through the two screw portions 13 and 14, to realize varied drag increase rates.

A pivotable lever may be used instead of the slidable engaging pin 15. These elements are collectively called a switchable connecting device 15 herein.

What is claimed is:

1. A drag structure of a fishing reel comprising:
   a drag controller for acting on a drag device to produce drag;
   first and second screws for causing said drag controller to move by different pitches relative to said drag device; and
   switchable connecting means for selecting a first engaging position to allow said first screw to move while preventing said second screw from moving, and a second engaging position to allow said second screw to move while preventing said first screw from moving;
   wherein said controller is moved by said first screw when the switchable connecting means is in the first engaging position, and wherein said controller is moved by said second screw when the switchable connecting means is in the second engaging position.

2. A drag structure as claimed in claim 1, wherein said switchable connecting means is an engaging pin.

3. A drag structure of a fishing reel comprising:
   a drag controller for acting on a drag device to produce drag;
   a fixed element rotatable in unison with a spool shaft;
   an intermediate movable element rotatable and slidable relative to said fixed element, said intermediate movable element including first and second screws; and
   switchable connecting means mounted on said intermediate movable element and switchable between a first engaging position to engage said intermediate movable element with said drag controller, and a second engaging position to engage said intermediate movable element with said fixed element;
   wherein said drag controller is moved by said first screw when the switchable connecting means is in the first engaging position, and wherein said drag controller is moved by said second screw when the switchable connecting means is in the second engaging position.

4. A drag structure as claimed in claim 3, wherein said intermediate movable element is screwed to an outer periphery of said spool shaft through said first screw, said intermediate movable element being screwed to an inner periphery of said drag controller through said second screw.

5. A drag structure as claimed in claim 4, wherein the thread pitch of said first screw is different than the thread pitch of said second screw.

6. A drag structure as claimed in claim 3, wherein said switchable connecting means is an engaging pin mounted on a side face of the intermediate movable element, said engaging pin being slidable in a direction perpendicular to said spool shaft.

7. A drag structure of a fishing reel comprising:
   a reel body;
   a drag controller for producing drag;
   a push sleeve, said push sleeve being substantially integral with said reel body;
   an intermediate sleeve including first and second screws; and
   switchable connecting means mounted on said intermediate sleeve and selectable between a first engaging position to engage said intermediate sleeve with said drag controller, and a second engaging position to engage said intermediate sleeve with said push sleeve;
   wherein said drag controller is moved by said first screw when the switchable connecting means is in the first engaging position, and wherein said drag controller is moved by said second screw when the switchable connecting means is in the second engaging position.

8. A drag structure as claimed in claim 7, wherein said intermediate sleeve is screwed to an outer periphery of said push sleeve through said first screw, and wherein said intermediate sleeve is screwed to an inner periphery of said drag controller through said second screw.

9. A drag structure as claimed in claim 8, wherein the thread pitch of said first screw is different than the thread pitch of said second screw.

10. A drag structure as claimed in claim 7, wherein said switchable connecting means is an engaging pin mounted on a side face of said intermediate sleeve, said engaging pin being slidable in a direction perpendicular to a spool shaft.

* * * * *